United States Patent
Gassner et al.

(10) Patent No.: US 10,452,518 B2
(45) Date of Patent: Oct. 22, 2019

(54) UPLOADING TENANT CODE TO A MULTI-TENANT SYSTEM

(71) Applicant: Veeva Systems Inc., Pleasanton, CA (US)

(72) Inventors: Peter Gassner, Pleasanton, CA (US); Jon Stone, Manteca, CA (US); Bobby Ng, San Ramon, CA (US); Eric Batzdorff, Alameda, CA (US); Arvind Talari, Dublin, CA (US); Rich Mayfield, Pleasanton, CA (US)

(73) Assignee: Veeva Systems Inc., Pleasanton, CA (US)

( * ) Notice: Subject to any disclaimer, the term of this patent is extended or adjusted under 35 U.S.C. 154(b) by 314 days.

(21) Appl. No.: 15/419,825

(22) Filed: Jan. 30, 2017

(65) Prior Publication Data

US 2017/0161172 A1    Jun. 8, 2017

Related U.S. Application Data

(63) Continuation-in-part of application No. 15/228,968, filed on Aug. 4, 2016, and a continuation-in-part of application No. 14/957,432, filed on Dec. 2, 2015, now Pat. No. 9,760,472.

(51) Int. Cl.
| | |
|---|---|
| *G06F 11/00* | (2006.01) |
| *G06F 11/36* | (2006.01) |
| *G06F 8/20* | (2018.01) |
| *G06F 8/60* | (2018.01) |
| *G06F 8/71* | (2018.01) |

(52) U.S. Cl.
CPC ............ *G06F 11/3664* (2013.01); *G06F 8/20* (2013.01); *G06F 8/60* (2013.01); *G06F 8/71* (2013.01)

(58) Field of Classification Search
CPC .... G06F 11/3664; G06F 11/3624; G06F 8/71; G06F 8/20; G06F 8/60
USPC ...................................... 714/38.14
See application file for complete search history.

(56) References Cited

U.S. PATENT DOCUMENTS

| | | | |
|---|---|---|---|
| 9,760,472 B2 * | 9/2017 | Batzdorff | G06F 11/3624 |
| 10,311,213 B2 * | 6/2019 | Gujarathi | G16H 40/20 |
| 2002/0055932 A1 | 5/2002 | Wheeler | |
| 2007/0027936 A1 | 2/2007 | Stakutis | |
| 2007/0271306 A1 | 11/2007 | Brown et al. | |
| 2008/0086482 A1 * | 4/2008 | Weissman | G06F 21/6218 |
| 2011/0040826 A1 | 2/2011 | Chadzelek | |
| 2011/0209121 A1 * | 8/2011 | Nagata | G06F 11/3684 717/124 |
| 2011/0296375 A1 * | 12/2011 | Mooney | G06F 8/423 717/106 |
| 2012/0246179 A1 | 9/2012 | Garza | |
| 2013/0024435 A1 | 1/2013 | Poirier | |
| 2013/0100958 A1 | 4/2013 | Jalan | |
| 2014/0359552 A1 * | 12/2014 | Misra | H04L 67/12 717/100 |
| 2015/0263865 A1 | 9/2015 | Rangarajan | |
| 2015/0339136 A1 | 11/2015 | Suryanarayanan | |

(Continued)

*Primary Examiner* — Yair Leibovich (57) ABSTRACT

Systems and methods for uploading tenant code to a multi-tenant system. Tenant Java source code is sent to the multi-tenant system over an MDL interface, and stored in a repository of the multi-tenant system as source code metadata. The tenant code may be extracted and executed when a predetermined event occurs.

5 Claims, 5 Drawing Sheets

(56) References Cited

U.S. PATENT DOCUMENTS

| | | | |
|---|---|---|---|
| 2015/0370540 A1* | 12/2015 | Coslovi | G06F 8/20 717/121 |
| 2016/0050247 A1 | 2/2016 | Skatell | |
| 2016/0050257 A1 | 2/2016 | Cassidy | |
| 2016/0062754 A1 | 3/2016 | Tripp | |
| 2016/0094406 A1 | 3/2016 | Phan | |
| 2016/0173590 A1 | 6/2016 | Pohjoisvirta | |
| 2016/0352690 A1 | 12/2016 | Wu | |
| 2017/0075794 A1* | 3/2017 | Ramakrishna | G06F 11/3692 |

* cited by examiner

```
Recreate Recordtrigger hello_world__c (
active (true),
source_code (` package com.veeva.vault.custom.triggers;

import com.veeva.vault.sdk.api.core.TriggerOrder;
import com.veeva.vault.sdk.api.data.*;

/*
* Created by Bob N. 7/16.
*/

@RecordTriggerInfo(object = "product__v", events = {RecordEvent.BEFORE_INSERT})
public class HelloWorld implements RecordTrigger { public void execute(RecordTriggerContext recordTriggerContext) { for (RecordChange inputRecord : recordTriggerContext.getRecordChanges()) {
            inputRecord.setError("OPERATION_NOT_ALLOWED", "Hello, World.");
        }
    }
}
```

FIG. 5

UPLOADING TENANT CODE TO A MULTI-TENANT SYSTEM

CROSS-REFERENCE TO RELATED APPLICATIONS

The present application is a continuation-in-part of U.S. nonprovisional patent application Ser. No. 14/957,432, filed on Dec. 2, 2015, entitled Tenant Code Debugging in Multi-Tenant Systems, and U.S. nonprovisional patent application Ser. No. 15/228,968, filed on Aug. 4, 2016, entitled Configuring Content Management Systems, which are hereby incorporated by reference herein for all purposes.

BACKGROUND

The subject technology relates generally to multi-tenant systems, and more particularly to uploading tenant code to a multi-tenant system.

In a multi-tenant system, a number of tenants share the hardware and software of the system. Developers working for a tenant may use an integrated development environment ("IDE") to develop custom code, or tenant code, and test it. After some iterations, they may upload the tenant code to the system to see how the tenant code behaves in the multi-tenant system. It is desirable to provide a method which allows each tenant to deploy tenant code from a local environment to the server runtime conveniently and securely.

SUMMARY

The disclosed subject matter relates to a method for uploading custom code to a content management system. The method comprises enabling display of a first interface for receiving tenant code, wherein the tenant code is Java source code developed by a tenant of the multi-tenant system and can run on a Java platform provided by the multi-tenant system, and wherein the first interface comprises an area for receiving the tenant code. The method further comprises: receiving a metadata definition language ("MDL") representation of the tenant code from a computing device over a network; storing the tenant code as source code metadata in a repository of the multi-tenant system; registering the tenant code with a tenant code registry of the multi-tenant system; receiving a request for the tenant code from a server of the multi-tenant system when there is a predetermined event; and extracting the tenant code from the tenant code metadata for execution.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
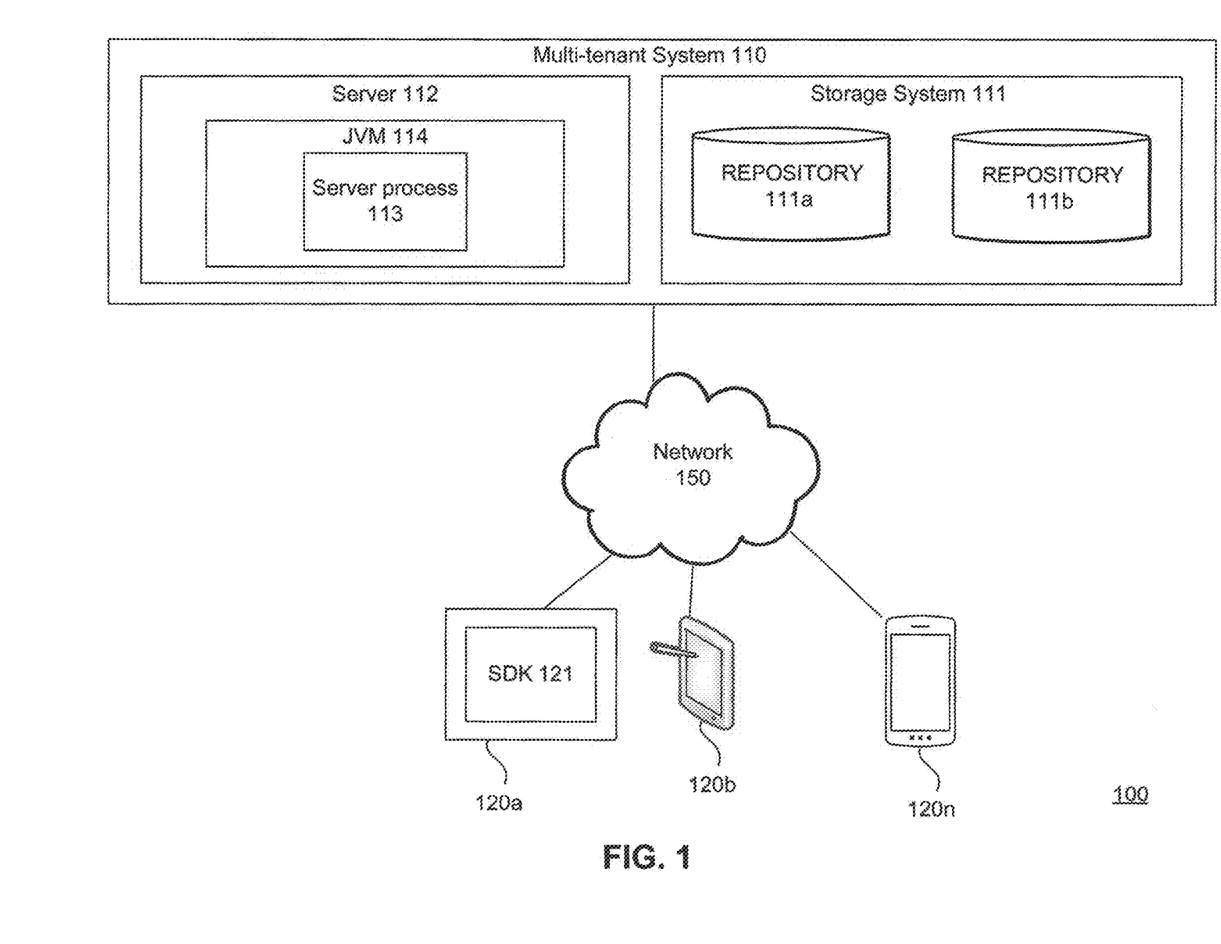
FIG. 1 illustrates an example high level block diagram of a multi-tenant architecture wherein the present invention may be implemented.

FIG. 1 illustrates an example high level block diagram of a multi-tenant architecture 100 wherein the present invention may be implemented. As shown, the architecture 100 may include a multi-tenant system 110, and a plurality of user computing devices 120a, 120b, ... 120n, coupled to each other via a network 150. The multi-tenant system 110 may include a storage system 111 and a server 112. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the multi-tenant system 110 via the network 150, and may be any commercially available computing devices including laptop computers, desktop computers, mobile phones, smart phones, tablet computers, netbooks, and personal digital assistants (PDAs). An SDK 121 may run on a user computing device, e.g., 120a, and access the system 110 via the network 150.

The server 112 is typically a remote computer system accessible over a remote or local network, such as the network 150. The server 112 could be any commercially available computing devices. A server process 113 may be active on the server 112. The user computing device and the server process 113 may communicate with each other over the network 150, thus providing distributed functionality and allowing multiple user computing devices to take advantage of the information-gathering capabilities of the system 110. Although FIG. 1 shows only one server, it should be understood that the system 110 may have multiple servers.

In one example, the server 112 may have a Java virtual machine ("JVM") 114 which may route a request from a user computing device to a repository (e.g., 111a or 111b) that the user is authorized to access. The server process 113 may run in the JVM 114.

The storage system 111 may store data in one or more repositories (e.g., 111a and 111b) that user computing devices may access. Code from different tenants may be executed in a common space in the server 112, but each tenant's data is segregated from other tenants' data in the storage system 111 by hardware or software. The storage system 111 may be any commercially available storage devices. In one example, the multi-tenant system 110 is a content management system, and the repositories may store content (e.g., documents in various formats) for tenants.

In a multi-tenant system, various elements of hardware and software may be shared by two or more tenants. For instance, the server 112 may simultaneously process requests from a plurality of tenants, and the storage system 111 may store data for a plurality of tenants. Each tenant may be assigned a repository (e.g., 111a), which is separated and secured from other tenants' data, by hardware or software. In a multi-tenant system, a user is typically associated with a particular tenant and is authorized by the tenant to access its repository. In one example, a user could be an employee of a pharmaceutical company which is a tenant, or customer, of the system 110. Each tenant has an exclusive share of the software and hardware of the system 110.

In one embodiment, the multi-tenant system 110 may run on a cloud computing platform. Users can access data on the cloud independently by using a virtual machine image, or purchasing access to a service maintained by a cloud database provider.

In one embodiment, the multi-tenant system 110 may be provided as Software as a Service ("SaaS") to allow users to access the system 110 with a thin client or a browser.

A tenant may register tenant code in its repository to run a particular event in the lifecycle of a record in the repository. The tenant code may be called triggers. In one implementation, a first tenant may register tenant code in its repository (e.g., 111a) which could run when a new record is created. For example, the tenant code may be registered to create a product audit record when a product is inserted. The tenant code may be loaded up from a content repository to the content management server 112 and executed.

Figure 2:
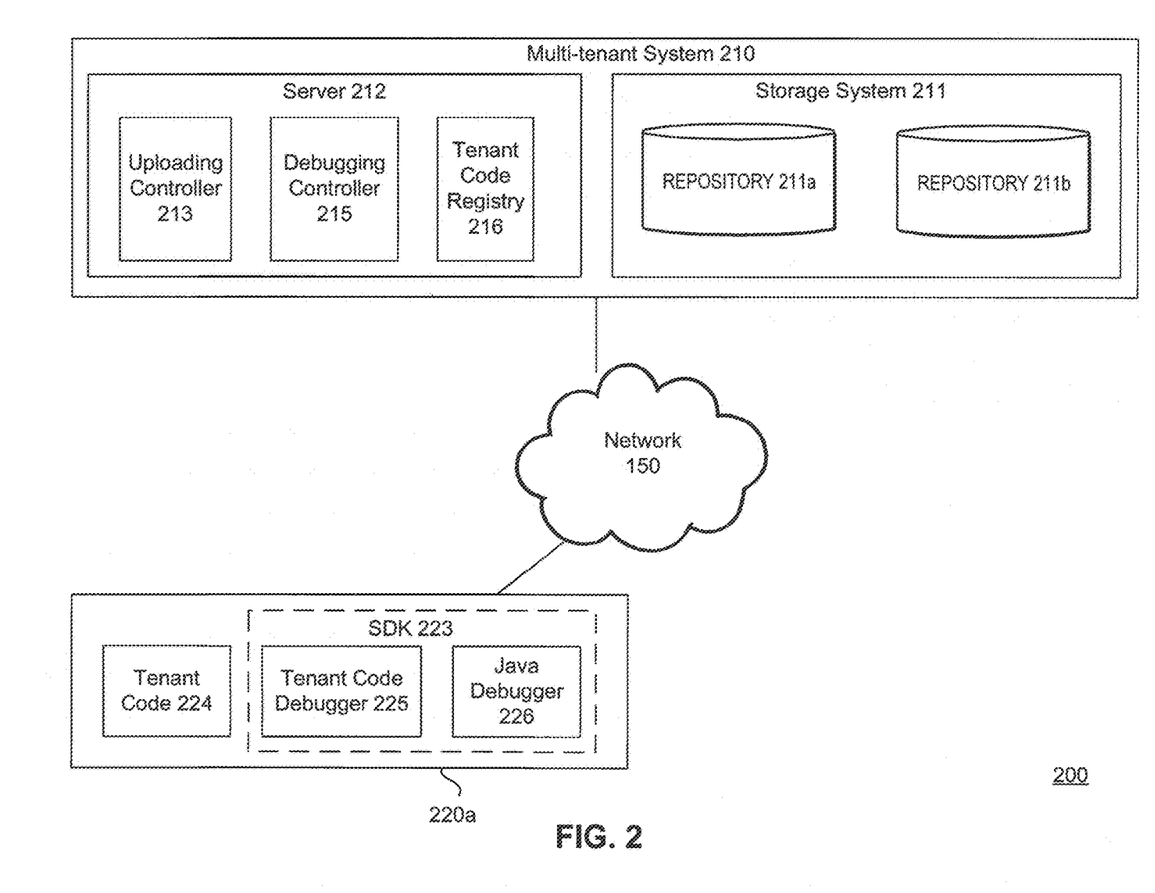
FIG. 2 illustrates an example high level block diagram of a tenant code uploading architecture according to one embodiment of the present invention.

FIG. 2 illustrates an example high level block diagram of a tenant code debugging architecture according to one embodiment of the present invention. A user may use the architecture to develop and debug tenant code. Tenant code is domain-specific code which is uploaded to a repository (e.g., 211a) by a user so that it can be executed by a server 212, and invoked by a system 210 when a particular event occurs in the lifecycle of a record therein. For example, the tenant code might be a record after-insert trigger on a Product object. In this case, when a Product is created in the system 210, it will invoke any after-insert triggers prior to committing that new Product data in a persistent storage. An event is a point in a record's lifecycle (e.g. after-insert). A trigger is domain-specific code invoked at an event in a record's lifecycle, e.g., the above after-insert trigger. A record is a "single, implicitly structured data item" in the system 210.

The user may develop the tenant code in an integrated development environment ("IDE", e.g., a Java IDE IntelliJ, Eclipse, or JDeveloper) on a user computing device (e.g., 220a). The user can use the IDE he likes, and it is not necessary to build or maintain special plug-in for each popular IDE.

As shown, a software development kit ("SDK") 223 may be downloaded to a user computing device 220a from the system 210 by the user for developing and debugging tenant code. The SDK 223 may be a set of Java libraries including the tenant code API's and a few programs. The programs may include a tenant code debugger 225, which may be a Java program. The programs may also include a Java debugger 226. The user may develop some tenant code 224, and temporarily store the tenant code 224 in the user computing device 220a for testing and debugging.

In addition to the server process shown in FIG. 1, the server 212 may have a debugging controller 215 and a tenant code registry 216. The debugging controller 215 could understand requests coming in from the SDK 223 in the user computing device 220a and interact with the tenant code debugger 225. When the debugging is done, the user may submit the tenant code to a repository (e.g., 211a or 211b) through the tenant code registry 216. In one implementation, the tenant code uploading controller 213, the debugging controller 215 and the tenant code registry 216 may run in a JVM.

There is some registered tenant code in the repository 211a which has registered interest in particular events. When those events occur, the record may ask the tenant code registry 216 which code it should execute and then the code is executed.

A tenant may upload its own code, which may be an application or business logic, to the platform provided by the multi-tenant system 210. The tenant code may be a programmable layer that runs the tenant's business logic when there is a specific event. In one implementation, the event may be an object event, and when a record is updated or deleted, or when a new record is inserted, the tenant may insert custom logic for defaulting or additional checking. The custom logic can be different from one customer to another customer. In one implementation, the event may be a document event, and when a document is uploaded, checked in or when the document properties are changed, the tenant's custom logic may be executed. Once a user has developed and tested the tenant code and is satisfied with it, he may deploy the tenant code to the multi-tenant system 210 and run it over there.

The tenant code may be transported to the multi-tenant system 210 using a metadata definition language ("MDL"). Main functions of the MDL may include: providing a list of MDL enabled components, with each of the components the MDL functions described below can be invoked; describing an MDL component; define the metadata for each MDL component; exporting an MDL component by retrieving its definition; and importing configuration of one or more components by manipulating their definitions.

MDL components define the model that holds the data for multi-tenant system configurations. Each component may contain a set of attributes and optionally further sub-components. The attributes define the data type and validation rules which are enforced when values are set into the attributes. The present invention provides a component metadata framework with which the components could get annotated and the shape and validation rules of the components could be dynamically acquired by client applications and an MDL parser. In one implementation, the component metadata framework may define the metadata for each component consisting of the following:

TABLE 1

| Metadata Field | Description |
| --- | --- |
| name | Component type name |
| label | Component user friendly label |
| active | Component status (true/false) |

The framework defines the metadata for each of the component attributes consisting of the following:

TABLE 2

| Metadata Field | Type | Description |
| --- | --- | --- |
| name | String | The unique attribute identifier |
| type | enum | the type of the data that can be stored by the attribute, options: String, Number, Boolean, Date, DateTime, XMLString, JSONString, <MDL Component>, |

TABLE 2-continued

| Metadata Field | Type | Description |
| --- | --- | --- |
| requiredness | enum | Whether it is required, optional or conditionally required to provide the value in this attribute. Options: "required", "optional', "conditional" |
| max_length | Number | Maximum length of the String (for String attributes) |
| max_value | Number | Maximum number that can be set into the attribute (value can be float) |
| min_value | Number | Minimum number that can be set into the attribute (value can be float) |
| editable | Boolean | Whether it is allowed to update the value in this attribute |
| multi_value | Boolean | Whether multiple values can he set |
| ordered | Boolean | For multi-value attributes, whether values in the list are ordered |
| enums | List | A defined list of acceptable values for an attribute. |

The framework may define the metadata for each component's sub-components consisting of the following:

TABLE 3

| Metadata Field | Description |
| --- | --- |
| name | Component type name |
| label | Component type label |

MDL uses a number of application programing interfaces ("APIs") as tools. One API may have a Describe function for generating information about the existing configuration in order for the API to generate or create a command.

MDL provides a number of commands, including RECREATE, CREATE, ALTER, DROP, RENAME, or COMMIT, which are described in detail in U.S. patent application Ser. No. 15/228,968.

The present invention also uses a special type of MDL component, Recordtrigger, that can represent an extension point of the multi-tenant system 210, specifically, object (CRUD) events can be handled with tenant code. The Recordtrigger component may contain Java source code as metadata. In one implementation, it may have Java source code in compile and in running from the metadata, and a user can load and run it in almost real time.

Some example MDL commands related to the Recordtrigger component are described below:

1. MDL EXECUTE commands: Create/Recreate/Alter Request

```
CREATE Recordtrigger subject_before_insert_vdc (
    source_code ('package com.veeva.vault.custom.triggers;
    import com.veeva.vault.sdk.api.core.CodeInfo;
    import com.veeva.vault.sdk.api.data.RecordTrigger;
    import com.veeva.vault.sdk.api.data.RecordTriggerContext;
    @RecordTriggerInfo(name="subject_before_insert_vdc",
        object = "subject_v",
        events = {BEFORE_INSERT, BEFORE_UPDATE});
    public class SubjectBeforeInsert implements
    RecordTrigger {
    @Override
    public void execute(RecordTriggerContext
    TriggerContext) {
        // TODO:
    }
    }
    ')
)
```

Figure 3:
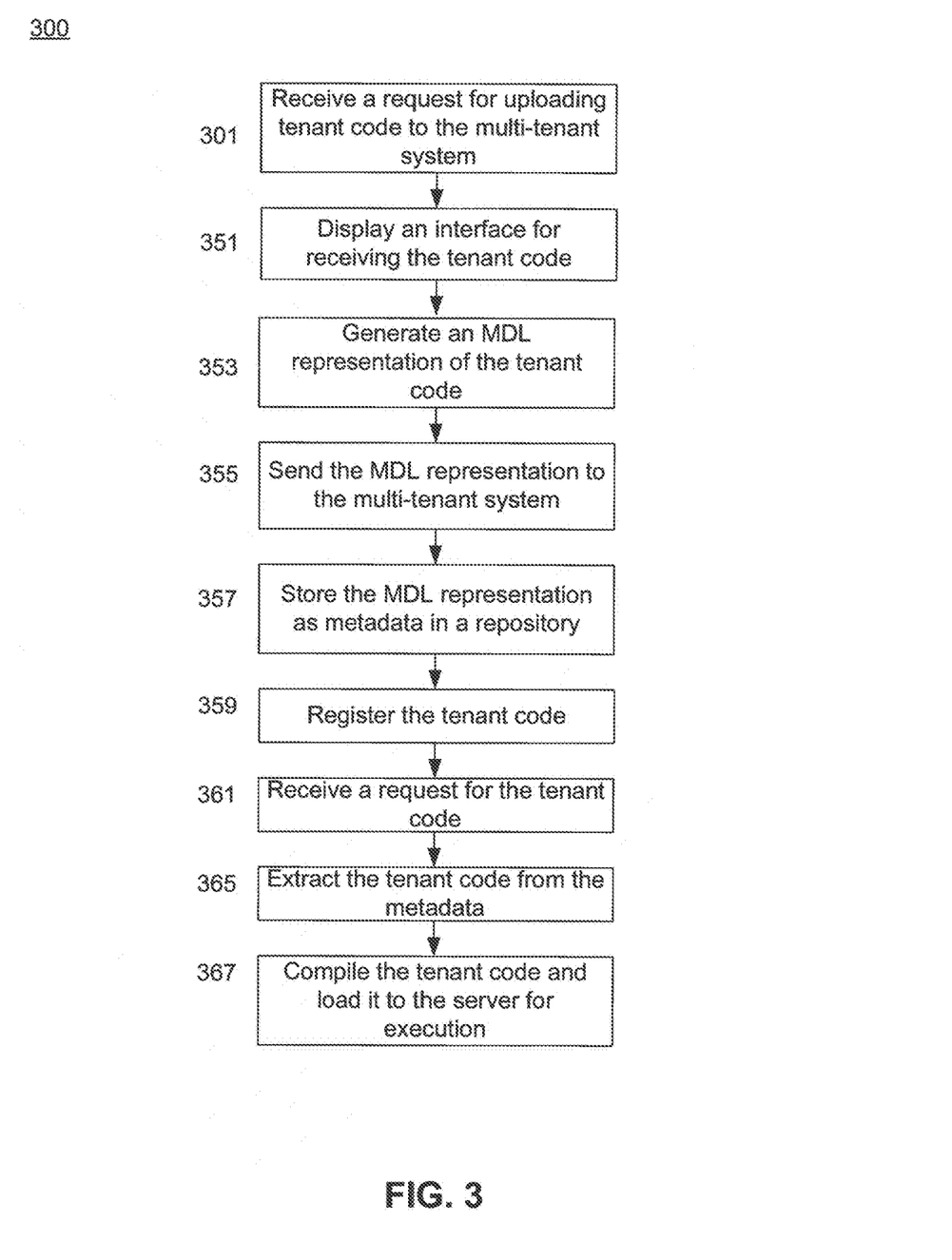
FIG. 3 illustrates a flowchart of a method for uploading tenant code in the multi-tenant architecture according to one embodiment of the present invention.

2. MDL EXECUTE commands: Drop
DROP Recordtrigger subject_before_insert_vdc;
3. MDL EXPORT
(GET)
https://{{host}}/api/mdl/components/Recordtrigger.subject_before_insert_vdc
4. MDL DESCRIBE
(GET)
https://{{host}}/api/v{{version}}.0/configuration/Recordtrigger
5. DOWNLOAD SOURCE CODE
(GET)
https://{{host}}/api/v16.0/configuration/Recordtrigger.subject_before_insert_vdc/SubjectBeforeInsert.java
6. MDL SCHEMA
(GET)
https://{{host}}/api/v{{version}}.0/metadata/components/Recordtrigger FIG. 3 illustrates a flowchart of a method for uploading tenant code to a multi-tenant system according to one embodiment of the present invention.

A user may start to develop the tenant code with the SDK 223. The user may be a developer working for a tenant of the multi-tenant system 210, and the tenant code can run on the platform provided by the multi-tenant system 210 to add tenant's custom logic. Prior to submitting the tenant code to the system 210, the user may use the tenant code debugger 225 to see if the tenant code behaves as expected. The tenant code debugger 225 may be launched in debug mode by the user. The tenant code may be debugged following the process described in the U.S. patent application Ser. No. 14/957,432. Once the user is satisfied with the code, he/she may request to upload the tenant code to the multi-tenant system 210. The request may be received by the system 210 at 301.

Figure 4:
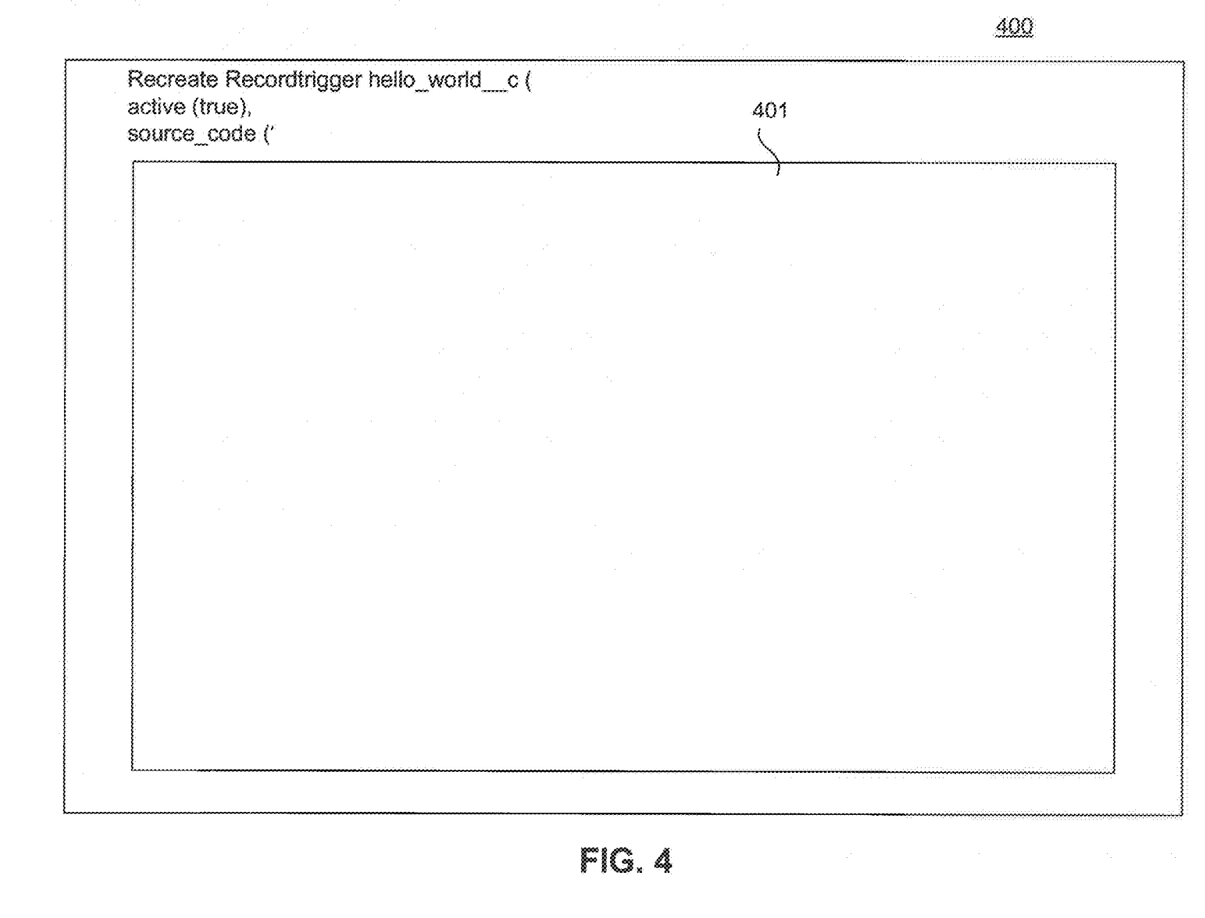
FIG. 4 illustrates an example application program interface ("API") for receiving tenant code according to one embodiment of the present invention.

At 351, an interface may be displayed for the user to upload the tenant code to the multi-tenant system 210. In one implementation, the interface is an application programing interface ("API"). As shown in FIG. 4, the interface may have an area for the user to input the tenant code. The user may paste the tenant Java source code in the area, e.g., with a tool called Postman or Curl, to send the request to an HTTP endpoint or a uniform resource locator ("URL"). In one implementation, the interface is a user interface. The user may paste the tenant's Java source code into the user interface. Either way, the Java source code may be sent to the server 212 and stored as metadata in a repository (e.g., 211a).

In one implementation, a button may be provided on an interface on which the user is writing the tenant code, so that the user may click on the button to send the tenant code to the multi-tenant system 210.

Figure 5:
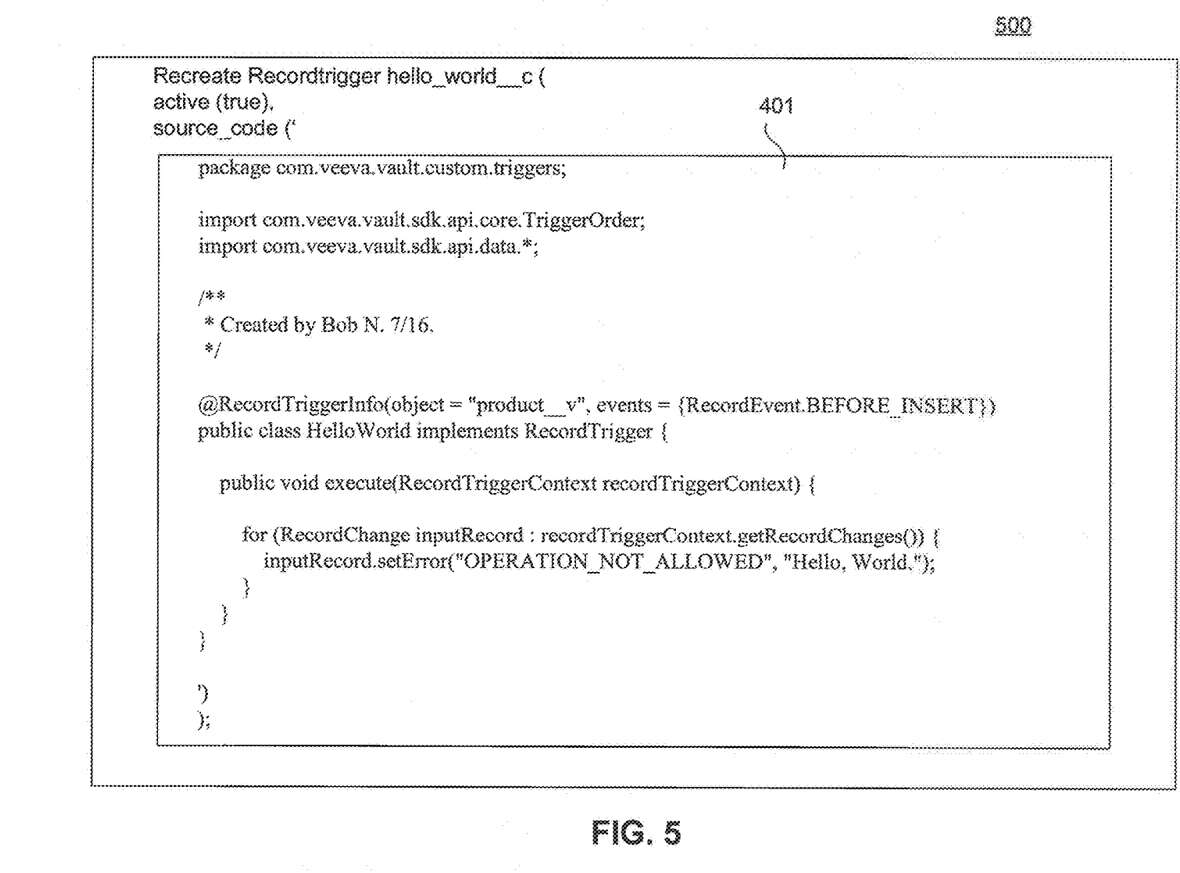
FIG. 5 illustrates an example MDL representation according to one embodiment of the present invention.

At 353, an MDL representation of the tenant code may be generated. One example of the MDL representation is shown in FIG. 5.

At 355, the MDL representation may be sent from the user computing device 220a to the server 212.

In one implementation, the source code in the MDL may be validated to make sure that it is executable in the multi-tenant system 210, and the multi-tenant system 210 allows its execution.

At 357, the tenant code may be stored as metadata in a repository, e.g., 211a. The tenant code may be stored as source code metadata, instead of binary or a compile. It can be extracted and put into another repository. It can also be upload to the server 212 to be compiled in real time and executed.

In one implementation, steps 357-367 may be performed in a real production environment to go live.

At 359, the tenant code may be registered at the tenant code registry 216.

The tenant code may be executed when there is a predetermined event. At run time, the server 212 (specifically, the uploading controller 213) may request to read the source code from a repository (e.g., 211a) at 361.

At 363, the tenant code may be extracted from the source code metadata in the repository e.g., by the server process 213. When there is a request during server run time, the server 212 may determine that it needs to run the tenant code. It may look up for the tenant code in the repository (e.g., 211a), load it to a memory and execute.

At 365, the tenant code may be compiled and loaded to the server 212, e.g., by the server process 213, and go live.

Since the Java source code can be directly uploaded, without a scripting layer, the present invention may be integrated into a Java tool, like an IDE, and used in the Java development environments of different tenants. The user does not have to learn a special language to use it.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for uploading tenant code to a multi-tenant system, comprising:
enabling display of a first interface for receiving tenant code, wherein the tenant code is Java source code developed by a tenant of the multi-tenant system and can run on a Java platform provided by the multi-tenant system, and wherein the first interface comprises an area for receiving the tenant code;
receiving, in the form of source code metadata, a metadata definition language ("MDL") representation of the tenant code from a computing device over a network;
storing the tenant code as source code metadata in a repository of the multi-tenant system;
registering the tenant code with a tenant code registry of the multi-tenant system;

receiving a request for the tenant code from a server of the multi-tenant system when there is a predetermined event; and extracting the tenant code from the tenant code metadata for execution.

2. The method of claim 1, wherein the first interface is an application programming interface ("API").

3. The method of claim 1, wherein the first interface is a user interface.

4. The method of claim 1, further comprising: determining that the tenant code is executable in the multi-tenant system.

5. The method of claim 1, further comprising: determining that the multi-tenant system allows execution of the tenant code.

* * * * *